United States Patent
Warner, Jr.

(10) Patent No.: US 11,151,219 B2
(45) Date of Patent: Oct. 19, 2021

(54) GENERATING RICH DIGITAL DOCUMENTS FROM LIMITED INSTRUCTIONAL DATA

(71) Applicant: Documensions, Inc., Sudbury, MA (US)

(72) Inventor: James A. Warner, Jr., Sudbury, MA (US)

(73) Assignee: Documensions, Inc., Sudbury, MA (US)

( * ) Notice: Subject to any disclaimer, the term of this patent is extended or adjusted under 35 U.S.C. 154(b) by 0 days.

(21) Appl. No.: 16/413,910

(22) Filed: May 16, 2019

(65) Prior Publication Data

US 2019/0332641 A1 Oct. 31, 2019

Related U.S. Application Data

(63) Continuation of application No. 15/588,963, filed on May 8, 2017, now Pat. No. 10,372,784, which is a continuation of application No. 15/427,463, filed on Feb. 8, 2017, now abandoned.

(51) Int. Cl.

| | |
|---|---|
| G06F 16/958 | (2019.01) |
| G06F 16/955 | (2019.01) |
| G06F 16/93 | (2019.01) |
| G06F 16/951 | (2019.01) |
| H04L 29/12 | (2006.01) |

(52) U.S. Cl.
CPC ............ *G06F 16/972* (2019.01); *G06F 16/93* (2019.01); *G06F 16/951* (2019.01); *G06F 16/9566* (2019.01); *H04L 61/301* (2013.01)

(58) Field of Classification Search
CPC ....... G06F 16/93; G06F 16/932; G06F 16/972
See application file for complete search history.

(56) References Cited

U.S. PATENT DOCUMENTS

| | | |
|---|---|---|
| 6,957,224 B1 | 10/2005 | Megiddo et al. |
| 7,930,208 B2 | 4/2011 | Sharman et al. |
| 8,472,987 B2 | 6/2013 | Bhatnagar |
| 8,499,099 B1 | 7/2013 | Kogan |
| 8,521,581 B2 | 8/2013 | Belwadi et al. |
| 8,676,171 B2 | 3/2014 | Kieser et al. |
| 8,793,571 B1 | 7/2014 | Warner |

(Continued)

OTHER PUBLICATIONS

Short Message Service. (Feb. 6, 2017). In Wikipedia, the Free Encyclopedia. Retrieved 15:31, Feb. 8, 2017, from https://en.wikipedia.org/w/index.php?title=Short_Message_Service&oldid=763919141.

Multimedia Messaging Service. (Jan. 16, 2017). In Wikipedia, the Free Encyclopedia. Retrieved 15:31, Feb. 8, 2017, from https://en.wikipedia.org/w/index.php?title=Multimedia_Messaging_Service&oldid=760311633.

(Continued)

*Primary Examiner* — Scott T Baderman
*Assistant Examiner* — Seung Woon Jung
(74) *Attorney, Agent, or Firm* — David J. Thibodeau, Jr.; VLP Law Group LLP

(57) ABSTRACT

A method and system for generating a digital document on a receiving mobile device from limited data that is transmitted to the device is disclosed. A shortened form of Uniform Resource Locator (URL) is sent and expanded to a longer URL that contains presentation data. The presentation data may include further nested shortened URLs to retrieve digital document components. Condensing techniques for transferring both presentation and location data further reduce transmission size. The combined retrieved data defines the content and presentation of a generated digital document.

14 Claims, 9 Drawing Sheets

(56) References Cited

U.S. PATENT DOCUMENTS

| | | |
|---|---|---|
| 9,147,204 B2 | 9/2015 | Iqram |
| 2006/0167992 A1 | 7/2006 | Cheung et al. |
| 2012/0136887 A1 | 5/2012 | Cha |
| 2013/0110620 A1 | 5/2013 | Zhu et al. |
| 2014/0200998 A1 | 7/2014 | Olliphant et al. |
| 2014/0259157 A1 | 9/2014 | Toma et al. |
| 2014/0317517 A1* | 10/2014 | Aoki .................. G06F 16/9566 715/738 |
| 2014/0331124 A1* | 11/2014 | Downs ................. G06F 40/106 715/243 |
| 2015/0026553 A1 | 1/2015 | Takeuchi et al. |
| 2015/0120788 A1 | 4/2015 | Brun et al. |
| 2015/0278173 A1 | 10/2015 | Deng et al. |
| 2015/0302456 A1 | 10/2015 | Rego et al. |
| 2016/0196239 A1 | 7/2016 | Liu et al. |
| 2017/0017939 A1 | 1/2017 | Killoran, Jr. et al. |

OTHER PUBLICATIONS

Portable Document Format. (Feb. 3, 2017). In Wikipedia, the Free Encyclopedia. Retrieved 15:32, Feb. 8, 2017, from https://en.wikipedia.org/w/index.php?title=Portable_Document_Format&oldid=763483089.

Datasheet "About Twitter's Link Service" downloaded from the internet Feb. 7, 2017, 1 page.

International Search Report and Written Opinion dated Apr. 26, 2018 for Related PCT/US18/17156.

Delimiter-separated values. Wikipedia [online], Retrieved on Jan. 16, 2018, Retrieved from the Internet: URL: https://en.wikipedia.org/wiki/Delimiter-separated_values.

Attribute-value pair. Wikipedia [online], Retrieved on Jan. 16, 2018, Retrieved from the Internet: URL: https://en.wikipedia.org/wiki/Attribute-value_pair.

JSON. Wikipedia [online], Retrieved on Jan. 16, 2018, Retrieved from the Internet: URL: https://en.wikipedia.org/wiki/JSON.

* cited by examiner

Nested shortened URLs

SMS message:

q://q/t259761          300

Presentation data:          310 t259761 → AA||svnci57|6urbjug||F|F|3|3|Did you know ...
?|0|ft41ied|F|F|F|F|F|F|F|A mobile boarding pass is
easy|20|0||28|c|8002235436|American
Airlines|34||L|i|ulcv72|0|||||||||F|||||||L||com.aa|F|F|F||||28|||"

Element Locator data:          320

6urbjug → |cqinl9r|American Airlines|1|2|||299|344|3|||||||||||

Element source page URL:          330 cqinl9r → https://www.aa.com/i18n/travel-info/travel-tools/mobile-boarding-pass.jsp

FIG. 2

Message assembly process – Start

SMS message:

110 q://q/t259761          400

130

Message assembly process – Output

Assembled digital document:

Did you know ... ?

430 A mobile boarding pass is easy

Save time, save paper

Once you get your boarding pass, just scan the barcode on the screen at airport security checkpoints and at the gate during boarding for American flights. It's fast and convenient!

How to get your mobile boarding pass:

440

450      460

Component faithfulness to original

Original mobile web page:

Component faithfulness to original

Assembled digital document:

Did you know ... ?

A mobile boarding pass is easy

Save time, save paper

Once you get your boarding pass, just scan the barcode on the screen at airport security checkpoints and at the gate during boarding for American flights. It's fast and convenient! 530

How to get your mobile boarding

GENERATING RICH DIGITAL DOCUMENTS FROM LIMITED INSTRUCTIONAL DATA

CROSS-REFERENCE TO RELATED APPLICATION

This application is a continuation of co-pending U.S. patent application Ser. No. 15/427,463 filed Feb. 8, 2017 entitled "Generating Rich Digital Documents From Limited Instructional Data", the entire contents of which are hereby incorporated by reference.

BACKGROUND

Technical Field

This application relates to generating digital documents from limited data.

Background Information

Digital documents based on markup languages, especially web pages based on HyperText Markup Language (HTML) markup language, have become widely accessible and utilized. Their richly styled and visual information may be viewed on a variety of computing devices, including smartphones, with browser software.

Smartphones also receive text messages automatically with commonly installed messaging software, and little effort is required to view them. Most messaging applications can also forward a hyperlink embedded in a text message, to enable viewing of HTML pages in a separate browser program.

Cellular network service providers developed the global text messaging service called Short Message Service (SMS) before TCP/IP-based Internet connections were possible with smartphones. Due to technology constraints, an SMS message is limited to 160 characters of text. But it became ubiquitous since it was installed on every cellular phone.

Various text compression techniques like GZIP or Base85 encoding may reduce a URL, depending on its length, to less than the message payload of an SMS message.

Multimedia Messaging Service (MMS) was created to send messages that include multimedia content over cellular networks. An MMS can include more text than an SMS, as well as images and even short video. The practical limit on content is approximately 300 kB. A significant drawback of an MMS compared to a web page, however, is lack of layout and display control. MMS messages are also much more expensive than SMS, and the recipient may not want to bear part of the cost.

A "shortened URL" is described in U.S. Pat. No. 6,957,224 to Megiddo et al. that reduces the characters required to express a standard HTML page Uniform Resource Locator (URL). A unique pre-assigned key, or short code, is bundled in a URL that calls a shortened URL translating server when activated. The shortened URL easily fits within a text message, e-mail, or Twitter "tweet" message for transfer to others. When the message is viewed and the shortened URL activated, the fully qualified long form of the URL of the desired web page is transferred to the web browser software running on the message-receiving device, which then retrieves and displays the web page. The translation function performed by the shortened URL server is similar to the exchange of an IP address for the domain name by a domain name server.

"Instant Messenger" or IM services have also been developed to facilitate person-to-person communication. These do not utilize the Short Message Service network, so they avoid any such cost. Their messages are transported by the Internet network service of the device's carrier. IM services can provide voice and video calls, and can send photos, like an MMS, and web page links, like SMS. They are compatible with standard SMS messaging, but they do not interoperate with each other.

Twitter, Inc. has offered its popular online service where users post and interact with text messages, called "tweets". Registered users can post tweets, but those who are unregistered can only read them. Users access Twitter through its website interface, SMS message, or a mobile device application.

Recent versions of Apple Computer's iOS mobile operating system include an iMessage messaging application that can extract a certain Open Graph tag in a source page specified by a URL. The tags may include text or images from the source page that are then displayed in the messaging application.

A corollary problem for a digital document that is generated at the receiving end of a transmission is maintaining faithfulness to its intended content and appearance. The Portable Document Format (PDF) file format, created by the founders of Adobe Systems, Inc., presents documents in a manner independent of application software, hardware and operating systems. A PDF file may sometimes include compressed components that reduce the original file size. Such a PDF document, however, is still far too large for direct transmission by text messaging.

Composing a document described by a markup language, such as HTML, also maintains reasonable faithfulness to content and appearance. The HTML file, like the Adobe PDF file, provides instructional data to viewer software, a browser for the former, Adobe Reader software for the latter. The size of the HTML and associated files, however, is also far too large for direct transmission by text messaging.

U.S. Pat. No. 8,793,571 by James Warner, entitled "System and Method for Repeat Viewing Components of Digital Documents and Determining Viewer Context" (the entire contents of which are hereby incorporated by reference), describes techniques for locating elements of a source web page without the need to download the entire page, such as by the structure of a web page standardized in a Document Object Model, which is implemented in web browser software, to dynamically identify a desired component of a source document.

SUMMARY

A viewer must exert both recall and effort proactively to locate and consume a rich digital document such as a web page. Conversely, the quantity of information and the presentation qualities of a text message, which is more effortless to receive, are extremely limited. Neither existing browser nor text messaging software can achieve the benefits of the other. Both senders and recipients of digital documents can benefit from a combination of both benefits—a rich digital document that can be sent with only limited data such as a text message.

In particular, it is possible to send a message that enables assembly of a rich digital document on the receiving device. It is also possible to reduce the instruction data that must be transmitted to complete such assembly to a certain minimal amount. In addition, the components of the assembly may be individually secured and displayed. Other purposes will be evident from the discussion that follows.

Described herein are a method and system for generating a digital document on a receiving mobile device from a limited data that is transmitted to the device. Such limited data may be, but is not required to be, sent in a single text message.

Creation of such a message so qualifying for such processing may consist of the following steps:

First, a shortened URL is created that specifies an expanded URL of a source web page or object where a component web element is located.

Second, a "locator string" is assembled that includes the shortened URL for the said source and other locator data attributes for finding and retrieving the target element. The target element may be specified and located using the techniques described in U.S. Pat. No. 8,793,571 to Warner entitled "System and Method for Repeat Viewing Components of Digital Documents and Determining Viewer Context" (incorporated by reference herein) although other techniques are possible. The locator string is then appended to a URL of a shortened URL translating server that can expand a shortened URL into the full locator string.

Third, the so constructed URL is then shortened to create a shortened URL for the locator string.

Fourth, the shortened URL for the locator string is embedded in a "presentation data string". The presentation data string may include, in a pre-determined pattern intended to achieve additional data compression, presentation attributes that, optionally, may be used to specify the layout, style, and additional content of the screen that is displayed to the viewer.

Finally, a URL is similarly constructed of the presentation data string and then itself shortened to create an initiating shortened URL. The textual message is assembled with the initiating shortened URL and, optionally, a database query term separate from the shortened URL and sent to the receiving device by a messaging service so capable of delivering.

Document assembly and display may consist of the following steps:

First, a qualifying message received by a message service running on the receiving device is submitted to an assembly application.

Second, the assembly application expands the shortened URL contained in the qualifying message and the nested shortened URLs embedded in successive URLs.

Third, the assembly application retrieves the target elements and other document components specified by the expanded URLs.

Fourth, the assembly application applies the presentation data optionally included in the expanded URLs to a predefined document structure template to set stylistic attributes and other data.

Fifth, the assembly application generates the rich digital document by assembling the desired components and displaying them according to the template, stylistic attributes, and other data.

In some implementations, the document assembly process may further leverage a filtering service to control access to document elements. This feature may be used to implement security measures, or other conditions on accessing the contructed page.

The resulting rich display: 1) is initiated by the sender, 2) is assembled and displayed in the receiving device application rather than linking out to the browser, 3) is faithful to its intended content and appearance, 4) may include access controls, 5) may include information needed to request updates or retransmission, and 6) the entire message download is much more efficient than downloading the comparable web pages and easier for the recipient to view.

It should be understood that this summary is provided to introduce a selection of concepts in a simplified form that are further described below in the Detailed Description of an Illustrative Embodiment. This Summary is thus not intended to identify key features or essential features of the claimed subject matter, nor is it intended to identify key features or essential features of the claimed subject matter, nor is it intended to be used as an aid in determining the scope of the claimed subject matter. It is intended that only the claims which follow define the scope of legal protection sought herein.

BRIEF DESCRIPTION OF THE DRAWINGS

The description below refers to the accompanying drawings, of which:

FIG. 2 shows nested shortened URLs embedded in the SMS message, the Presentation data and the Element Locator data.

Figure 1:
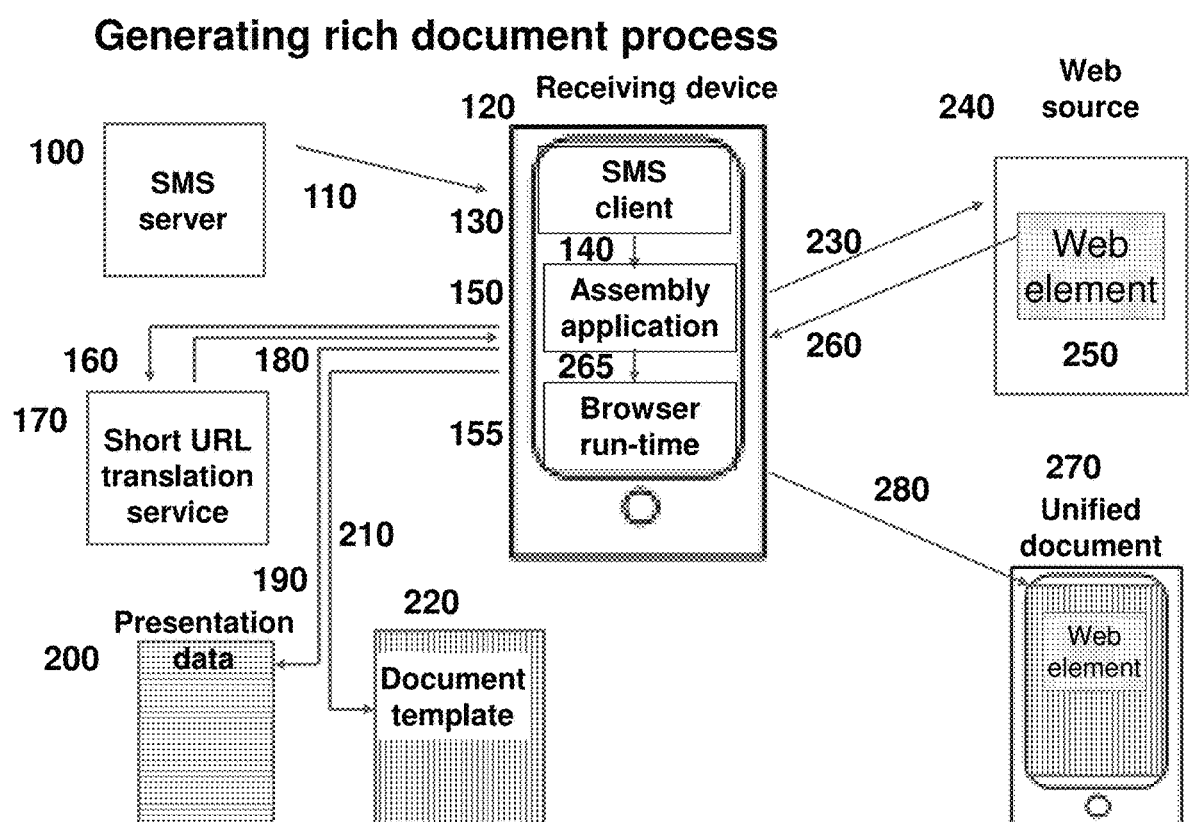
FIG. 1 shows a diagram of a process, including hardware and software components, for generating a rich digital document from a shortened URL.

The foregoing will be apparent from the following more particular description of example embodiments of the invention, as illustrated in the accompanying drawings in which like reference characters refer to the same parts throughout the different views. The drawings are not necessarily to scale, emphasis instead being place on illustrating embodiments of the present invention.

DETAILED DESCRIPTION OF AN
ILLUSTRATIVE EMBODIMENT

A description of example embodiments of the invention follows.

A method and system for generating a digital document on a receiving mobile device from a minimum of received instructional data is disclosed. Rich digital documents cannot be "pushed" to a recipient device using prior techniques. Text messaging can "push" a message, but that is typically limited in size. Many mobile messaging services have a limit of 160 or fewer characters of text; in the case of Twitter, messages are limited to 140 characters.

Senders of many types of text messages would benefit from being able to send a text message that consists of a rich digital document. Recipients would benefit from text messages that contain more information, are more attractively presented, and enable more interaction opportunities.

Methods and systems to transmit sufficient data to generate a desired rich digital document using as little instructional data as can fit in the message payload capacity of a text message contain several aspects:

1. Foregoing transmission of the voluminous, complete specification of a desired digital document, only instructional data about how to locate the data needed to assemble and present the document is transmitted.

2. An assembly application running on the recipient device performs document assembly and applying presentation attributes.

3. Web elements are downloaded from remote web sources and assembled on the receiving device.

4. A specific document template format provides a display layout that is less flexible than coding an HTML page but which reduces the number of attributes that must be specified.

5. Short URLs are used, not merely as web URL pointers, but to transport strings of instructional data used for presentation attribute specification and to locate the web elements and other resources to be displayed.

6. Successive expansion of shortened URLs enables a presentation data string to be assembled on the transmit side and deconstructed on the receive side.

7. Additional interaction features are enabled in the generated document than are possible with the limitations of a text message.

8. Document componentization enables access control or substitution independent of the initial message specification.

It should be noted that any messaging service in addition to SMS that can interoperate with the embodiment can deliver the instructional data to generate such rich digital documents. The present embodiment does not require, but only enables, a messaging service payload so limited.

One overall method of generating a rich document consists of receiving a message that contains limited instructional data for presenting a desired rich digital document, expanding a short URL that it includes, extracting from the expanded URL both the presentation data and the short URLs of location data for any component elements, expanding the location short URLs that may be so contained, further extracting the short URL of the source document, retrieving such component elements using the remaining locator data, assembling a desired rich digital document of such data, and displaying the so generated document using a browser run-time capability included in the mobile device operating system.

Instructional Data Transmission

The WorldWideWeb consortium standards enable display of digital documents of considerable display flexibility using browser software. They suffer some loss of reproduction fidelity, particularly of layout appearance on mobile screens, and they demand highly detailed programming syntax. Still the total size of the files that describe a single web page are far too large to transmit in a text message.

A sender can send a URL in a message which results in display of the linked web page in a device's browser program, without sending the underlying HTML and other files. Yet sending even a small message containing HTML code will exceed SMS capacity.

As a result, the disclosed invention abandons the common approach of sending a completed pre-formed document. Instead, it sends only metadata containing instructions (referred to herein as "instructional data") for how to assemble the document from components obtained separately by the recipient device and to present the so assembled document.

Assembly Application

An assembly application consists of program code running on the receiving device. Either automatically or by user-initiated action, it receives a message from a messaging service running on the receiving device, detects the message has content for it to process, and extracts an initiating shortened URL code. It proceeds to expand the shortened URL, which is typically further nested in sequential shortened URLs, extract the presentation data, and retrieve the document components. It assembles the components and applies the presentation data to the document template to complete generation of the desired rich digital document and displays it using a browser run-time capability included in the mobile device operating system.

Web Elements Downloaded Text messages are by nature condensed and specific. Displaying only a web page element with specific information matches the character of a short textual message and the expectations of recipients. The prior art of attaching a full page with often irrelevant, distracting, and/or inappropriate content may require additional effort to navigate. The recipient may not even view the page because the link to it must be consciously activated. The transport load of web elements instead of the entire web page typically may be a much lighter load, consume less of the recipient's data plan allotment, and require less time.

A further benefit of only downloading a specified web element as a component of the desired digital document is that it reduces and simplifies content management. Instead of requiring updates to a second source of information, re-using elements from a web page enable that web page as an authoritative source.

Template

The embodiments described herein are not a page description language, such as HTML or like PDF. Instead, they use a template of pre-defined digital document objects that can adjust display attributes according to values supplied in a standardized string, called the "presentation data string".

The template pre-defines a document structure that trades the display flexibility of PDF or HTML for a less flexible layout but with a highly concise description of display attributes. Various templates with different document structures may be utilized.

The template document objects may be standard Document Object Model objects. They are arranged for display to enable flexible layout. One embodiment for Android devices, for example, may contain one or more of ImageView, WebView, and TextView elements arranged in TableLayout, RelativeLayout, or LinearLayout structures in an eXtensible Markup Language (XML) display definition of a template.

Those template document objects may adapt their size and location identically to the way they adapt on a so-called "dynamic web page". The technique of structuring dynamic web pages may make web content present more acceptably on devices with different size screens.

Each object of the template may have numerous attributes that can be specified. These can vary the size, background color, text, textual style and color, or alignment of the display of the object. For document components displayed in such objects, a shortened URL of the locator data for retrieving such component is specified.

Each of these attributes is specified at a precise sequential location in the presentation data string. Such location is specifically determined to provide a tradeoff between display flexibility and a more economical attribute description. In one example, the desired rich document will display a title and a textual footer, with the title object background color specified at the beginning of the presentation data string and the style of the footer text specified at the end. Alternatively, JSON strings may be utilized but that requires the presentation data string to include key names. This unnecessarily inflates the string length if the positions of attributes in the string is known and maintained.

The presentation data string, in one embodiment, consists of values separated by a "separator character", each value corresponding to the desired value for the attribute at each specific location.

An example form of a template and presentation data string, using the "|" character as a separator of attributes with predetermined functions, could be:

AA||svndi57||6urgjug|FFFFFF . . .

This presentation data assigns "AA" as an ID, recognizing the next sequential "|" character as the termination of the attribute value. The ID field can be used for whatever the sender of the document wants. In one example, the ID field can be specific to a particular message and/or document. In another example, the ID field may be used to distinguish templates used for different notifications; the ID field can also be an identifier for a service's client. It is meant to be flexibly applied and is not determinative about the particular document contents or display.

The lack of a value for the second attribute (as indicated by the immediately following sequential "|") may assign a default value to the Title object as a background color.

The third attribute, the short URL "svndi57", is to be expanded to locator data. In one example, the locator data may expand to a longer URL for a document element, such as an image, that can be retrieved independently from retrieving an entire source page. For example, the locator data may retrieve the image via an IMG element's SRC attribute. However, the locator data may be used in other ways. As a second example, the locator data, after expansion, may specify a longer character string that includes a URL for a source web page; the same or yet other locator data may be further expanded to obtain information for how to extract the element from the source web page. In this example, the further information might specify one or more HMTL tags in the source page, such a table (<table>) tag, paragraph (<p>) tag, unordered list <ul> or some other tag to identify the element. The second example may use the techniques described in U.S. Pat. No. 8,793,571 referenced above to locate such an element.

The fourth attribute is another short URL for locator data for the topmost web element; none is specified since the value is blank. The fifth attribute is yet another short URL for still other locator data, that being for the lowermost web element and is specified as "6urbjug". This shortened URL will be expanded in the element location step. The sixth attribute is used as the color for the screen background; "FFFFFF" signifies it should be white.

Numerous techniques may be used to specify, with a minimal number of characters preferred, various attributes of the template document objects. So, for example, the default, if no value is specified, may indicate the most likely value that would be desired.

Another technique may assign a single letter in the presentation data string to represent a longer attribute, such as a seven-character hexadecimal color; so "F" would signify "#FFFFFF" or "white". Similarly, "S" may signify that the attribute color is the same as another related element. A single character can also be a code for the name of a resource image file.

An object of the template can be a web element that is retrieved at the time of document assembly. As a result, the information it displays should be the most current available from that source.

The template can be modified, saved and re-used for additional messages.

Unique Short URL Use

These embodiments extend the original purpose of shortened URLs from linking to a web page to a unique new use for passing presentation and element locator data in the expanded URL. Shortened URLs are used in two different unique ways: 1) as a link to a web element that is a component or child element of the entire parent web page and 2) as a more efficient string compression mechanism for transmitting individual web element and presentation data for constructing and styling a document on the receiving device. The locator data for an individual web element typically exceeds SMS message capacity. So the instructional data that includes component locator data plus presentation data for a document far exceeds SMS message capacity. Applying various text compression techniques to the instructional data still exceeds SMS capacity. Therefore, the required data compression is achieved by applying a shortened URL for each component's locator data and another for the digital document presentation data.

Such shortened URLs may be re-used by a sender for many such messages. In order to incorporate personalized data, such as the recipient's name, or information specific to an individual message, such as a flight number, product SKU or an appointment time, a string of characters is appended to the Element locator data, either as another short URL or in plain text depending on the length. The assembly program attaches these characters to the Element source page URL, when it is expanded, to form a database query that will retrieve the specific data for incorporation in the desired digital document. As an example, a database query may be desired for flight #2605. The message sent to the receiving device which is expanded by the method disclosed would reveal Element locator data: |cqin19r|American Airlines|1|2|||299|344|3||||||||||flight:2605|. The text "flight: 2605" is query data for a database search. The assembly program would combine the Element source page URL and the query data contained in the Element locator data and submit a database query with a form like http://www.aa.com/?flight=2605 to obtain additional data which is inserted in the digital document.

Note that successful forwarding of a message is more reliable if it is sent in a common format, for example, SMS. Therefore, an additional benefit using shortened URLs, with or without database queries, is to encourage and enable forwarding of messages, which is particularly beneficial for messages, for example, of a promotional nature.

Interaction

SMS messages limit interaction between sender and recipient to reply or linking to a web page. It is possible to signal the assembly application to provide additional means of interaction. The content and presentation of the generated document may be changed as a result of hiding or displaying different document components and retrieving and presenting different web elements. Additional recipient actions may be presented, such as refreshing data presented in the document, transferring communications to different means of interaction, such as a voice call or chat capability, or further transmitting the initial instructional data. The assembly application may also communicate further with the document component server(s) or other server(s).

Document Componentization and Security

The present disclosure teaches the assembly of a rich digital document on a device from a received message that includes necessary instructional data. The assembly is independent of the messaging service that delivers the instructional data. Components to be assembled are retrieved from one or more remote web sources as specified by the locator data extracted from the expanded instructional data. Further communication between such sources and the assembly application may retrieve additional or changed components.

This componentization of the document enables control of the components independently. Whether they are concealed or displayed and the style of their presentation can result from recipient actions, access controls, and events external to the document.

Recipient actions can cause a component to be hidden or displayed according to the context of the recipient, the device, or the content simply by changing a visibility attribute in the displayed document. Exercise of a call-to-action by the recipient can similarly cause hiding or display of various components or retrieval of additional components of the document. For example, pressing a Chat button, which may be included in the displayed document by the specification of the corresponding file name in the specified location in the presentation data string, can execute chat client software or connect to an app that uses a remote Artificial Intelligence (AI) program to provide an automated, interactive conversation. Pressing a Help button, in another scenario, can replace some components of the document with others.

Access controls at the web source server can be applied to document components as they are used at present for web pages. One common control may be to restrict access to a web page by requiring password submission. Another control directs a web browser requesting a web page at a URL, for example, to either the full-screen version or the mobile version of the page depending on the device the browser is running on. Also, once downloaded to the web browser, many web pages display different content depending on cookies found on the display device, and often make further changes based on the viewer's subsequent actions with the page.

Because each component is individually retrieved, access controls on the delivery and presentation of each can be exercised individually at its source. This embodiment, optionally, can utilize a filtering server, web server security, or other means that control access to the expansion of the shortened URL or substitutes a different web element.

An additional access control may optionally require authentication of the recipient before a component is downloaded to the assembly application. Authentication of the sender may also protect the recipient from clicking a link in a malevolent message with a spoofed sender. Said authentication could be provided by commonly available enterprise directories or popular user authentication sign-in capabilities. Thus, this embodiment extends server-level controls for some such customization, personalization or security functions to the components of the page just like web pages are controlled.

A few cases where control of a specified component may be desirable include: 1) the message recipient may be associated with different group attributes, e.g., subscribers of a service or not, 2) the retrieval may be re-directed to a different element due to unavailability or other conditions, 3) an individual should receive some information different from a group, e.g., her connecting flight information, 4) access controls may block delivery of a component of a document according to different levels of security based on device attributes, recipient responses to challenges, location of the device, etc.

Finally, events external to the document displayed can control or change component display. The assembly program can react to events on the receiving device such as notifications from alarms or calendar events. By monitoring the results of a remote data source, the assembly program can respond to a change in a remote variable, such as a change in score, status or condition, and change the displayed document.

An Example Embodiment

Referring now to FIG. 1, this shows one example embodiment of the system components and an overall method of generating a rich document. An SMS server 100 sends an SMS message 110 with the initial instructional data as a short URL to an SMS client 130 on a receiving device 120. The SMS client software 130 receives an SMS message from the SMS server 100 via an appropriate communication link (which is typically a cellular, WiFi, and/or other wireless or wired link), and then passes the instructional data 140 to an assembly application 150 running on the receiving device 120. The assembly application 150 sends the short URL received in the instructional data to a short URL translation server 170. The URL translation server expands the short URL and returns an expanded URL 180, which contains the presentation data, back to the assembly application 150. The assembly application 150 then repeatedly sends additional short URLs that may be embedded in the presentation data, and other short URLs that may be embedded in element locator data (which in turn was embedded in the presentation data), to the translation server 170 for expansion. It should be understood that the translation server 170 used in this step may be the same or a different translation server as used in the initial translation step. The assembly application 150 extracts 190 the presentation data 200. The assembly application 150 then selects the document template 220 for the desired document. If a component of the desired rich document is an element of a web source 240, the assembly application 150 requests it 230 using the locator data. The request 230 may be made directly to one or more web sources 240; optionally, a filtering server 810 (as shown and discussed below in connection with FIG. 7) may control access to the element and may grant access or deny it at 820. If access is granted, the web source 240 provides access to the web element 250 and downloads it 260 to the assembly application 150. The assembly application 150 combines the web element(s) 250, the presentation data 220 and the document template 230 to generate a unified document 270. The unified document 270 may then be presented on a display (not shown) such as by a browser run-time 155 running on the receiving device 120.

The assembly application 150 may be delivered to the receiving device 120 in any number of ways, for example, via a prior download from an application program source such as Google™ Play or Apple™ iTunes, via another distribution server, or via on demand delivery such as Google Android Instant Apps.

FIG. 2 shows an example of nesting the shortened URLs in a SMS message, the Presentation data and the Element Locator data. This example is for an airline website that displays mobile boarding pass information for American Airlines. An initial shortened code 300 is expanded to the Presentation data 310. That includes a nested shortened code that is expanded to the Element Locator data 320 which, in turn, includes a nested shortened code pointing to an Element source page URL 330 for the web element referring to boarding pass information.

In some implementations, the random short code 300 can be replaced by a particular "tag", such as "American Airlines flight 2605", that may be more understandable to a viewer. That will allow an SMS with a message like:

"Special update for you. Click to view:
http://example.aa.com/American Airlines flight 2605"

to cause the same "American Airlines flight 2605" message to all passengers on that flight. Each time the message is sent (each day, each update before takeoff, each flight segment, etc.) that message then picks up whatever the latest data is from the flight status database.

It is also possible to change the document component that tag causes to be displayed. For example, if the flight is near landing when the message is viewed, the short URL embedded in the presentation data can cause the flight status table of information to change to the baggage location information, and an image can change from a plane to a carousel.

Figure 3A:
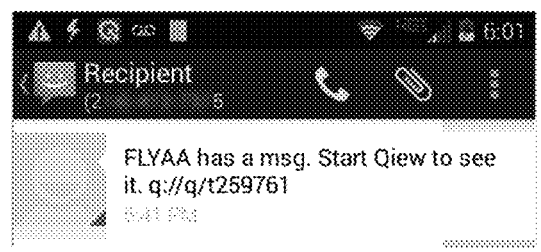
FIGS. 3A and 3B show the Start of the process of display with an SMS message and its screen shot and the screen shot of an Output of the finished display.
Figure 3B:
Figure 3B:

FIG. 3A shows a screen shot of a message displayed by the SMS client software 130 of the receiving device. The SMS message 110 includes the initiating short URL 400. When the SMS message 110 is received on the receiving device and displayed by SMS client software 130, the SMS message may automatically initiate processing by the assembly application 150, or the user can click the link that includes the shortened URL. Further processing by the assembly application 150 starting with expansion of the shortened URL 400 to result in the output 430 of the desired unified digital document 270 as shown in FIG. 3B.

Optionally, a message displayed by the disclosure may include a button bar 440 that may be displayed in various ways, placements and forms. The button bar 440 provides one or more "call to action" buttons that simplify follow-on actions, requests for information, or support needs. A "click-to-call" button 450 may prepare the embedded phone application with a telephone number to call for further information, help or transactions. An "OK" button 460 can dismiss and delete the message or provide a context menu of additional options. Many other types of buttons may be inserted that initiate or conclude transactions or connect to additional information sources from web landing pages to chatbots that can answer questions in a conversational style. Furthermore, a call-to-action may be expressed as some other form than a button, such as a link, a clickable image, etc. as found on standard web pages.

Figure 4A:
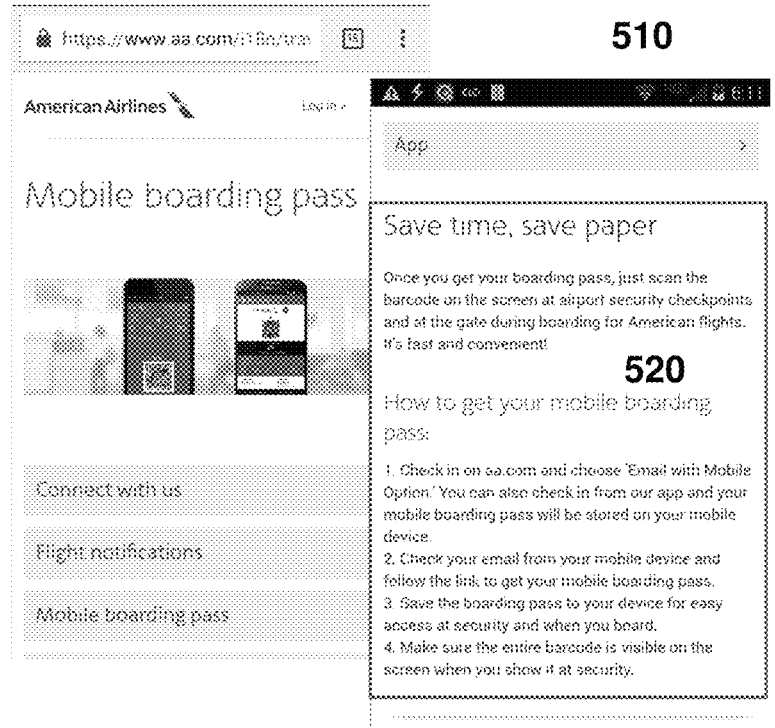
FIGS. 4A and 4B show a comparison of the display of an outlined web element by a mobile web browser and the assembled message showing the same outlined web element with the identical styles applied.
Figure 4B:
Figure 4B:

FIGS. 4A and 4B illustrate the faithful presentation of the received document component compared to the display of the same document object in the original web source page. An original mobile web page displayed in a browser 500 can be scrolled to reveal further content 510. A web element 520 has been chosen from that page 500 to be displayed in the rich digital document that is to be delivered by methods described herein. FIG. 4B illustrates a portion of that element 530 has been displayed in the assembled message. The rendering of the styles of the source element is identical because the style specifications of the original web page are applied without modification in the delivered document. In one implementation, the corresponding style sheets, such as Cascading Style Sheets (CSS) are also downloaded from the source page with the web element. In a different implementation, different styles could be applied by changing the style attributes applied, if so desired.

Figure 5:
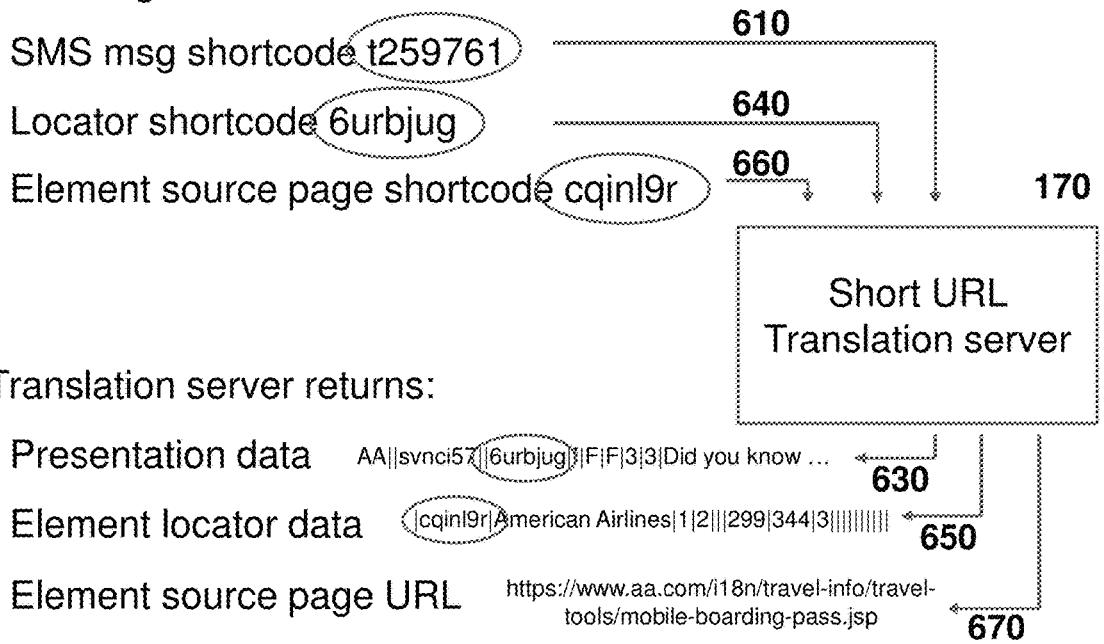
FIG. 5 shows a diagram of the Presentation data and Locator data expansion process.

FIG. 5 shows one implementation of the Presentation data and Locator data expansion process. The assembly application 150 running on a receiving device 120 sends shortened URLs to the Short URL Translation Server 170 repeatedly. Multiple nested applications of the Short URL are used as a data compression method to repeatedly expand the instructional data as needed to assemble the desired rich digital document. In a first step 610, the shortened URL embedded in the SMS message is expanded by the Short URL Translation Server 170, which returns the Presentation data at step 630. Locator shortened URLs embedded in that are re-submitted in step 640 to the Translation Server for expansion to the Element locator data at 650. The expanded Element locator data includes the Element Locator shortened URL for the source page of the document component. That is again submitted in step 660 to the Translation Server for expansion to the Element source page URL at 670.

Figure 6:
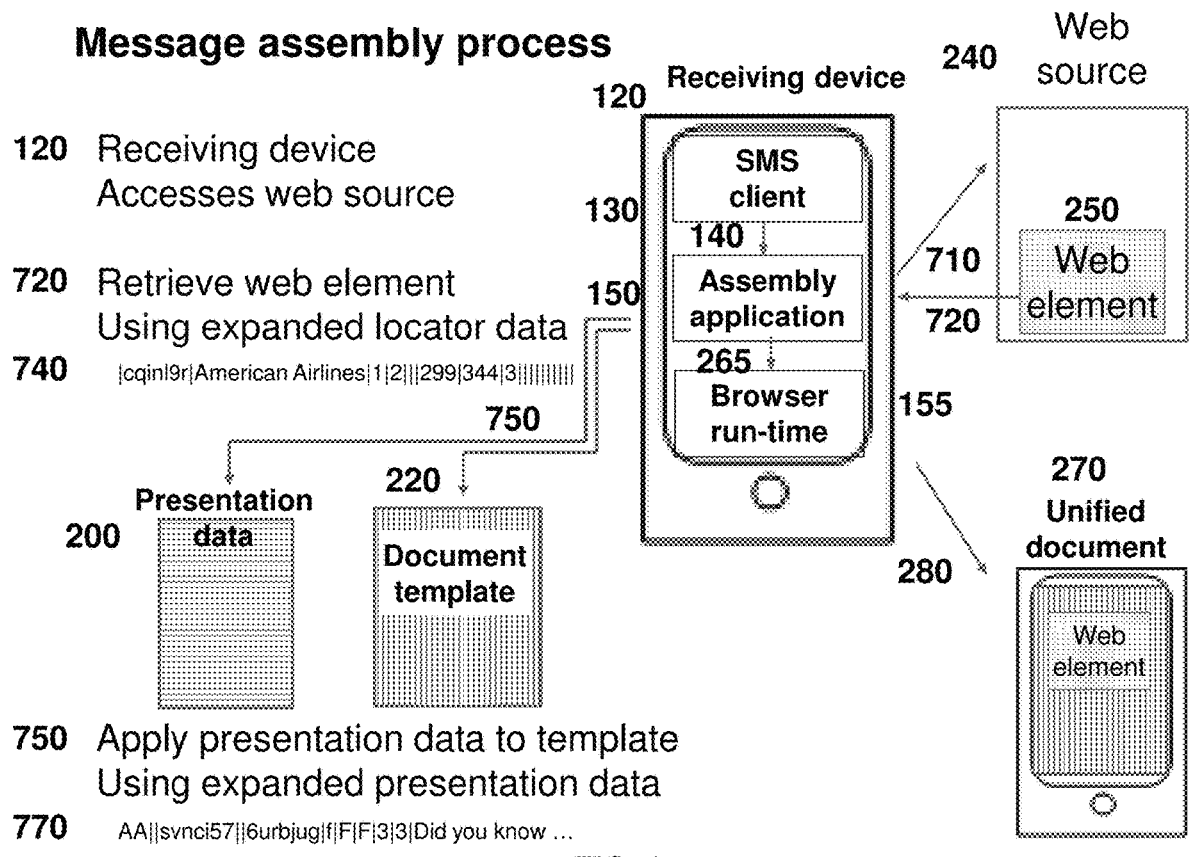
FIG. 6 shows a diagram of the Message assembly process.

FIG. 6 shows one implementation of a Message assembly process. After completing the Presentation and Locator expansion process of FIG. 5, receiving device 120, using the assembly application 150, accesses Web Source 240 at step 710. Said source page could include an Element source page URL; step 710 may be the result of a database query or a web page that is generated by a search query. The desired web element 250 is retrieved at step 720 using the expanded locator data 740. The assembly application applies in step 750, the expanded presentation data embedded in the presentation data 770 to the document template 220. In step 265 it then assembles the web element components 250 and the document template 220 into a unified document 270 that is displayed 280 by the browser run-time 155 on the Receiving device 120.

Figure 7:
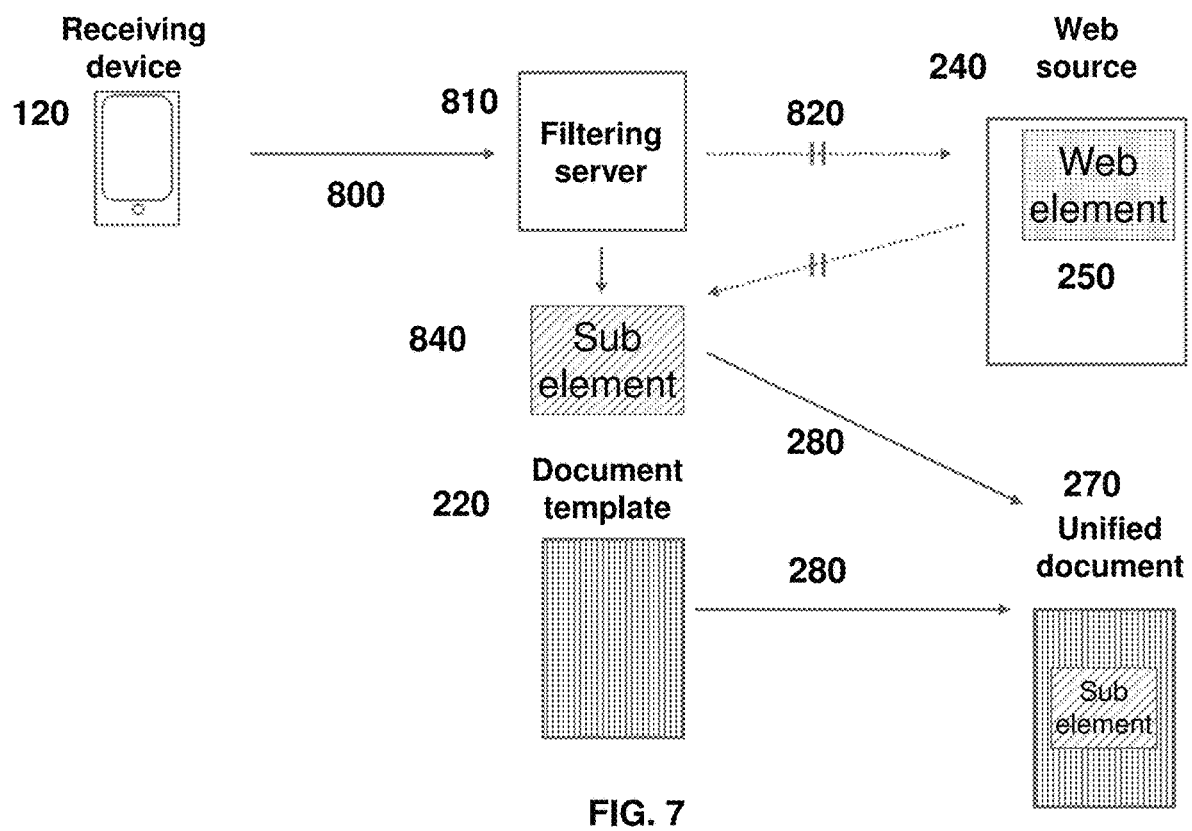
FIG. 7 shows a diagram of Document component security and display control.

FIG. 7 shows a document component security and display control process. The message assembly process may be altered by controlling of the content of the desired rich digital document 270. Access to components may be controlled for security measures, commercial conditions, or other conditions. In a first step 800, receiving device 120, using the assembly application 150, attempts to access Web Source 240. In this embodiment a filtering server 810 controls access to the Web element 250. Applying business logic or access rules, in step 820 denies access to element 250 and may deliver instead a substitute element 840. The display assembly step 280 combines the substitute element 820 and the document template 220 and any other components into the Unified document 270.

In prior art, the shortened URL has been utilized to transmit data for various particular purposes. The embodiments described herein, in contrast, utilize the shortened URL two different unique ways: 1) as a shorter pointer to the data needed to locate an element of a web page, not to the entire web page, and 2) as a more efficient compression mechanism to transmit instructional data, including both said locator data for an individual web element and presentation data for constructing and styling a document on to the receiving device.

While the above has particularly shown and described example embodiments of the invention, it will be understood by those skilled in the art that various changes in form and details may be made therein without departing from the scope of the invention as encompassed only by the appended claims.

What is claimed is:

1. A method for generating a digital document on a receiving device (120) comprising:
   receiving an initial short code (110) from a server (100);
   forwarding the initial short code (110) to a short code expansion server (170) to obtain expanded data (180);
   forwarding any short codes that may be embedded in the expanded data to the short code expansion server (170) to obtain additional data;

processing the expanded data and any resulting additional data to obtain presentation data, and to obtain locator data that may be embedded therein;

wherein the presentation data embedded in the expanded data and any resulting additional data includes presentation attributes that specify one or more of layout, style, or additional content of the digital document;

from the presentation data, determining a document template (220) for the digital document;

when a component of the document template is a web element (250) of a web source (240), retrieving (260) the web element (250) using the locator data;

generating the digital document (270) by combining (a) the presentation data that was obtained from the expanded data and any resulting additional data, and (b) the document template (230), and (c) any result of retrieving the web element using the locator data; and presenting the digital document (270) on a display.

2. The method of claim 1 wherein retrieving (260) the element (250) further comprises:

granting or denying access (820) to the web element (250).

3. The method of claim 1 wherein presenting the digital document (270) further comprises:

presenting the digital document (270) via a browser run-time (155) running on a device that received the initial short code (110).

4. The method of claim 1 wherein no short codes are embedded in the expanded data.

5. The method of claim 1 wherein the step of generating the digital document further controls whether data presented or components thereof are concealed or disclosed, and the step of presenting the digital document is further determined by actions taken by the user, by access controls that block delivery or provide substitute data, or by events external to the message, such as alarms, calendar notifications, or changes of remote events.

6. The method of claim 1 wherein the step of generating the digital document further applies values of presentation attributes to the document template that are determined by actions taken by the user, by access controls on the data, or by external events, such as alarms, calendar notifications, or changes of remote events.

7. The method of claim 1 wherein one of the expanded data or additional data includes query data, and the method additionally comprises:

initiating a search or a database query using the query data and the component locator data to obtain additional data; and wherein the step of generating the digital document also applies the additional data thereby obtained to the document template.

8. An apparatus for generating a digital document comprising:

one or more communication interfaces;

a display; and a processor, for executing program code, the program code for:

receiving initial instructional data that contains at least an initial short code from one of the communication interfaces;

forwarding the initial short code to a short code expansion server over one of the communication interfaces and in response thereto, receiving expanded data;

forwarding any short codes that may be embedded in the expanded data to the short code expansion server to obtain additional data;

processing the expanded data and any resulting additional data to obtain presentation data, and to obtain locator data that may be embedded therein;

wherein the presentation data embedded in the expanded data and any resulting additional data includes presentation attributes that specify one or more of layout, style, or additional content of the digital document;

from the presentation data, determining a document template that provides structure for the digital document;

when a component of the document template is a web element of a web source, further processing the expanded data and resulting additional data to obtain URL data, and then retrieving the web element using the locator data;

generating the digital document by combining fa) the presentation data that was obtained from the expanded data and any resulting additional data, (b) the document template, and any results of retrieving the web element using the locator data; and presenting the digital document on the display.

9. The apparatus of claim 8 wherein the program code for retrieving the web element further comprises:

granting or denying access to the web element.

10. The apparatus of claim 8 wherein the program code for presenting the digital document further comprises:

presenting the digital document via a browser run-time running on a device that received the initial short code.

11. The apparatus of claim 8 wherein ne-short codes are embedded in the expanded data.

12. The apparatus of claim 8 wherein the program code for generating the digital document further comprises:

controlling whether data presented or components thereof are concealed or disclosed, and presenting the digital document is further determined by actions taken by the user, by access controls that block delivery or provide substitute data, or by events external to the message, such as alarms, calendar notifications, or changes of remote events.

13. The apparatus of claim 8 wherein the program code for generating the digital document further comprises:

applying values of presentation attributes to the document template that are determined by actions taken by the user, by access controls on the data, or by external events, such as alarms, calendar notifications, or changes of remote events.

14. The apparatus of claim 8 wherein one of the expanded data or additional data includes query data, and the program code is additionally for:

initiating a search or a database query using the query data and the component locator data to obtain additional data; and generating the digital document by also applying the additional data thereby obtained to the document template.

* * * * *